United States Patent [19] [11] B 3,916,103
Morrell et al. [45] Oct. 28, 1975

[54] INTERCONNECTOR FOR TELEPHONE UNITS

[75] Inventors: Ronald Joseph Morrell; Graham Sterling Laing; Charles Gordon McEwan, all of London, Canada

[73] Assignee: Northern Electric Company Limited, Montreal, Canada

[22] Filed: Apr. 9, 1973

[21] Appl. No.: 349,321

[44] Published under the Trial Voluntary Protest Program on January 28, 1975 as document no. B 349,321.

[52] U.S. Cl............ 179/1 PC; 179/1 HF; 339/75 M
[51] Int. Cl.$^2$.......................................... Ho4M 1/00
[58] Field of Search........ 179/1 PC, 1 HF; 325/355; 339/75 M, 91 R

[56] References Cited

UNITED STATES PATENTS

| | | | |
|---|---|---|---|
| 2,771,559 | 11/1956 | Montmeat | 325/355 |
| 3,054,024 | 9/1962 | Van Dillen et al. | 325/355 |
| 3,120,987 | 2/1964 | Degnan et al. | 339/75 M |
| 3,425,025 | 1/1969 | Williams | 339/75 M |
| 3,605,070 | 9/1971 | Krafthefer | 339/91 R |
| 3,651,446 | 3/1972 | Sadogierski et al. | 339/91 R |

*Primary Examiner*—Kathleen H. Claffy
*Assistant Examiner*—Douglas W. Olms
*Attorney, Agent, or Firm*—Sidney T. Jelly

[57] ABSTRACT

Associated units of a telephone set are physically and electrically connected by connectors having two parts, a part retained in the housing of each unit. Interengaging formations on each part interact to clip the parts together and thus clip the units together. The use of connecting cables is avoided.

2 Claims, 15 Drawing Figures

INTERCONNECTOR FOR TELEPHONE UNITS

This invention relates to interconnectors for telephone units and in particular to connectors which both electrically and physically connect two units into side-by-side unitary relationship.

In modern telephone systems it is becoming usual to have additional units for connection to a telephone set to extend its use -for example by providing the ability to use the telephone without the need to hold the handset in the users hand. Also data input to a computer or other apparatus can be fed via a telephone set with the appropriate additional unit or units.

It is usual to connect the units by means of flexible cables. These cables are often relatively large. As a result the flexibility is limited. If units are positioned on a desk the connecting cables are a nuisance and if close proximity of units is desired then the cables must be relatively long to provide sufficient flexibility. When several units are connected together then the problem becomes extreme and normally the additional units are positioned separately from the telephone unit -requiring an additional surface in the office.

The present invention provides for the connection of units in intimate side-by-side relationship without any interconnecting cables. The units are held together by the interengagement of connector parts, a part in each unit.

Interconnection of telephone parts, in accordance with the present invention, is obtained by a connector, the connector comprising one part affixed to the housing of one unit, and another part affixed to the housing of another unit, the two parts each having electrical connecting means for electrical interconnection between the units, and each also having inter-engaging formations whereby when the units are positioned in a side-by-side relationship and urged towards each other, the electrical connecting means interengage and also the interengaging formations clip together, resisting parting of the units. Conveniently the parts of the connector each are a sliding fit into apertures formed in the housing of the units, the apertures being capable of closure by blanking members when a connector part is not required to be inserted.

The invention will be readily understood by the following description of an embodiment, and modifications and variations thereto, by way of example, in conjunction with the accompanying drawings, in which.

Figure 8:
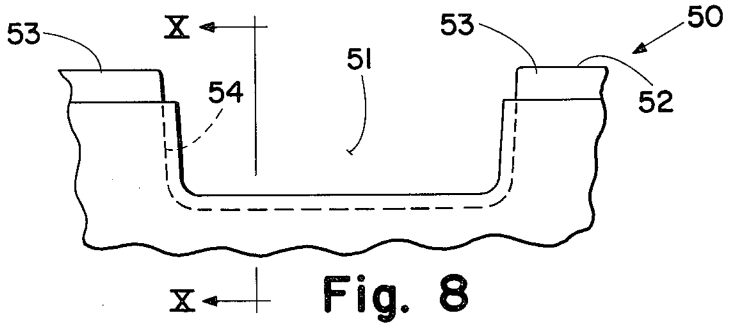
Figure 10:
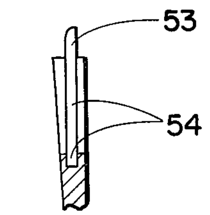
Figure 9:
Figure 11:
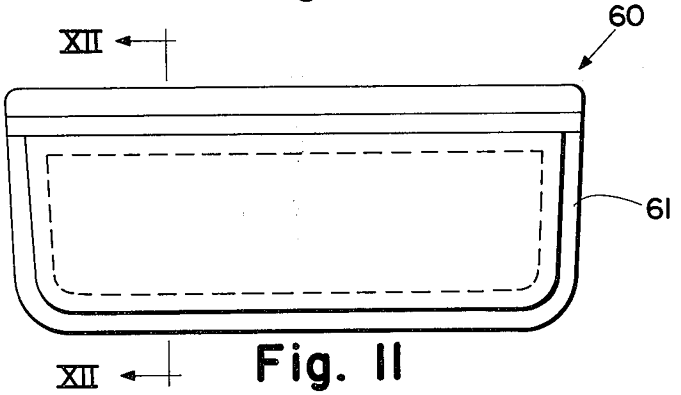
Figure 12:
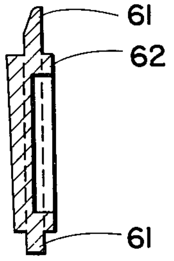
Figure 13:
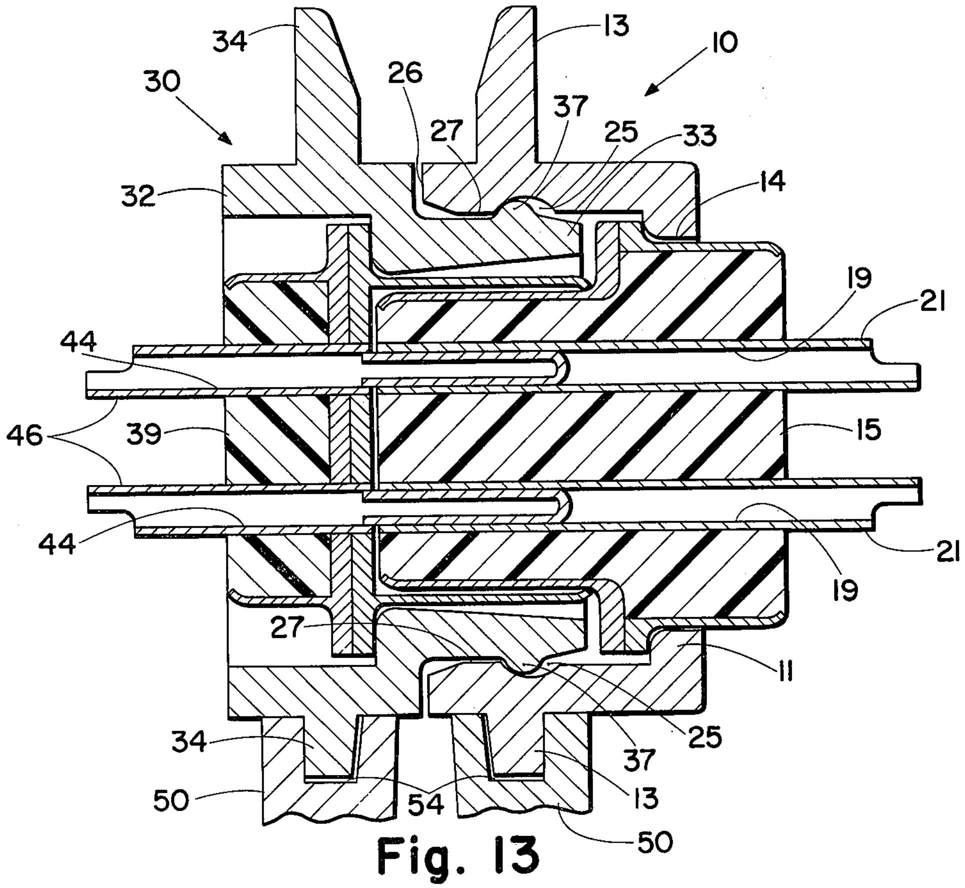
Figure 14:
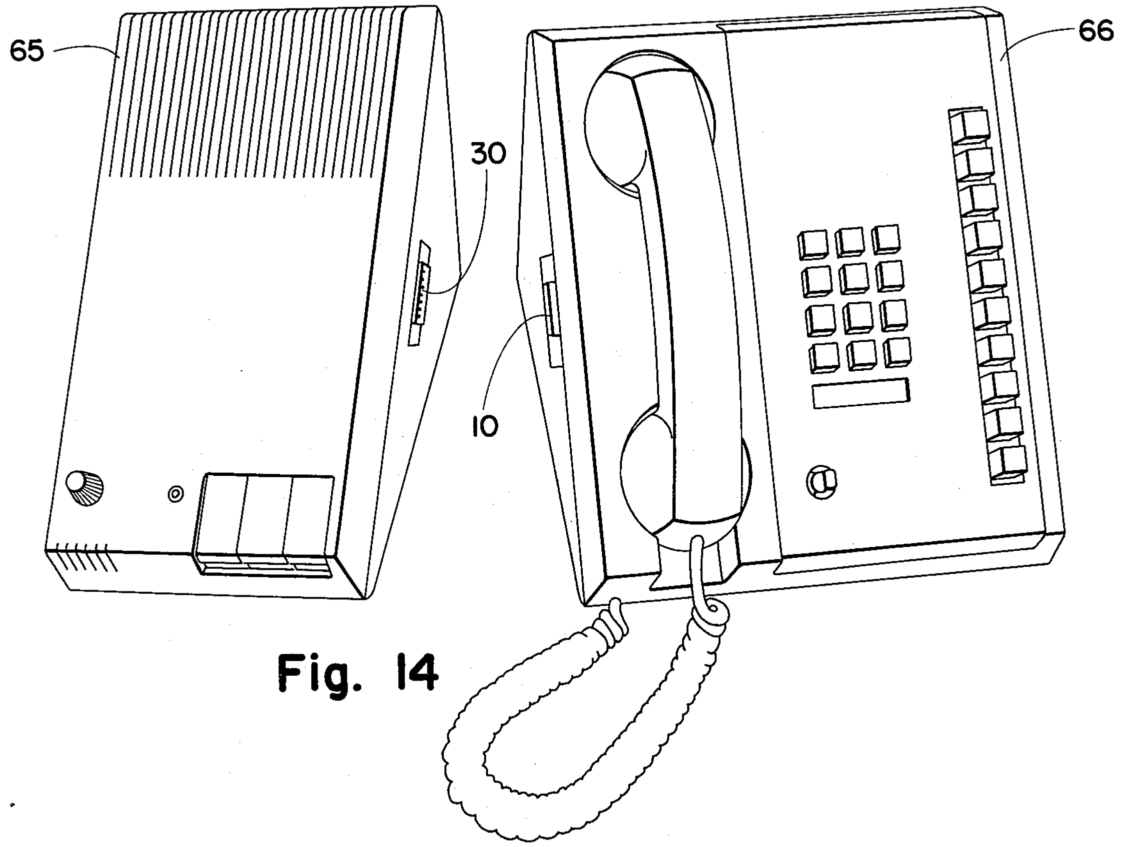

FIGS. 8, 9 and 10 respectively are side view, top view and cross-section on line X—X of FIG. 8, of one form of aperture in a unit housing;

FIGS. 11 and 12 respectively are a side view and a cross-section on the line XII—XII of FIG. 11 of one form of blanking member for the aperture of FIGS. 8, 9 and 10;

FIG. 13 is a cross-section through a connector shown clipped together;

FIG. 14 is a perspective view of two units in position to be connected; and

Figure 15:
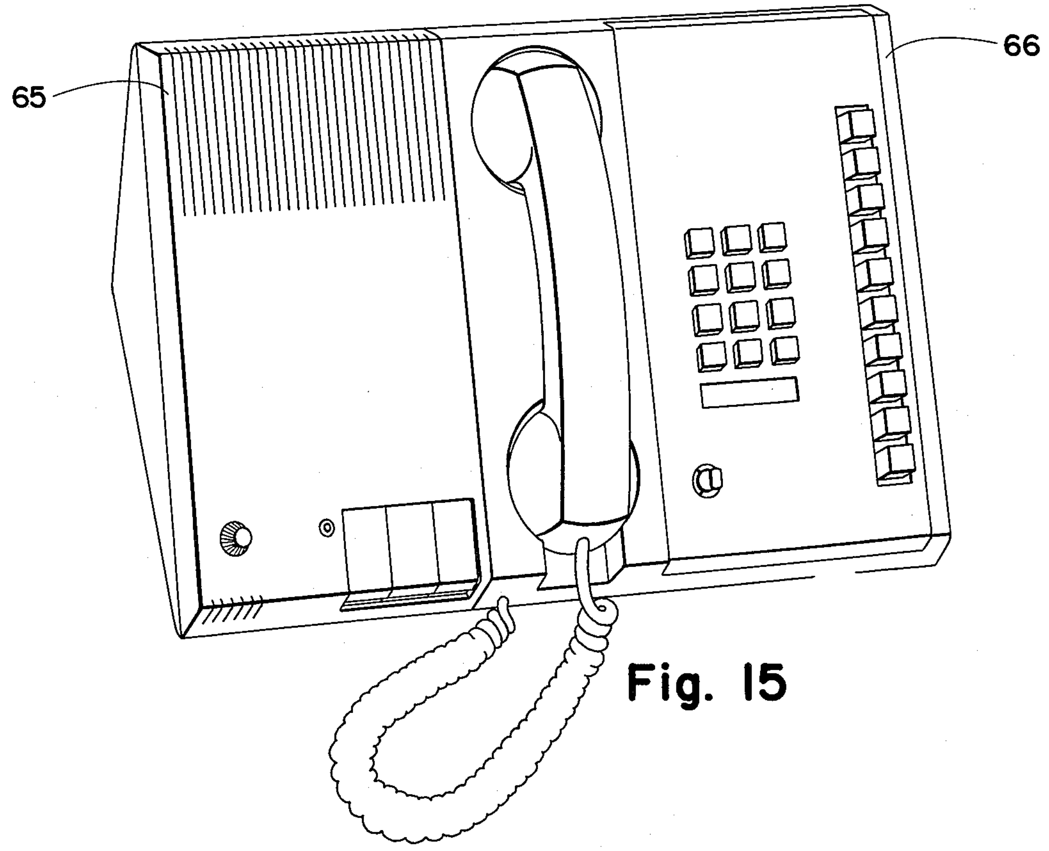

FIG. 15 is a perspective view of the units of FIG. 14, connected.

As stated connection between two units is made by a connector having two parts, one part in each unit. One of the parts is illustrated in FIGS. 1 to 4, and, in the example shown, has an electrical connecting member in which the terminals are of female form. As seen in FIGS. 1 to 4 the connector part 10 is of molded construction, of a hollow cup-like cross-section, housing a base 11 and a rim 12. A flange 13 extends outwardly around the periphery of the part, by means of which flange the part is positioned in the housing of a unit, as will be described later. The part 10 is rectangular in form and has a rectangular aperture 14 in the base 11. An electrical connector 15 is positioned in the aperture 14, being fixed by rivets 16 through a flange 17 formed on the connector 15. The rivets 16 pass through holes 18 in the base 11. The connector 15 has a plurality of terminals 19 therein, the terminals being of female form at the front face 20, and having electrical lead attachment tags 21 at the rear face 22.

Formed in the top and bottom portions 23 and 24 of the interior surface of the rim 12 are four recesses 25. The recesses 25 are spaced a short distance in from the front surface 26 of the rim 12. These recesses cooperate with protrusions on the cooperating connector part, as will be described. A small local thickening of the rim 12 occurs in front of each recess, as indicated at 27. This thickening provides for improved interengagement between the parts, as will be seen.

Figure 1:
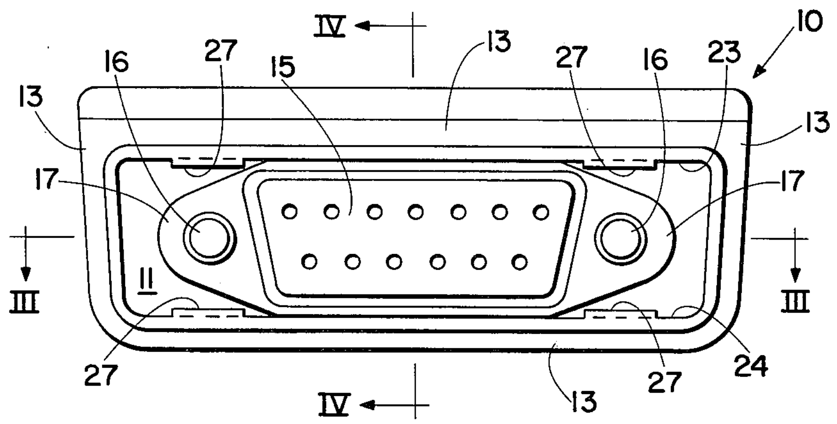
FIGS. 1 and 2 are side and end views respectively of a connector part for one telephone unit.
Figure 2:
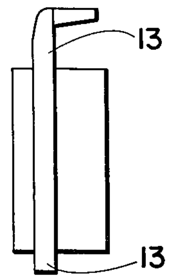
Figure 3:
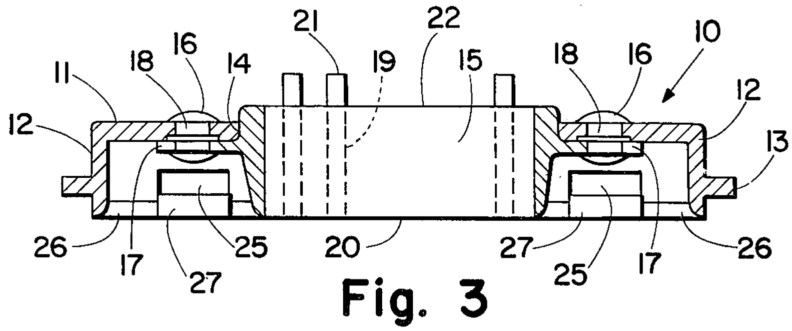
FIGS. 3 and 4 are cross-sections on the lines III—III and IV—IV respectively of FIG. 1.
Figure 4:
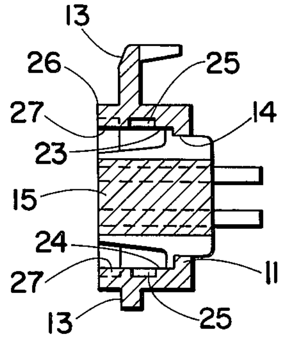
Figure 5:
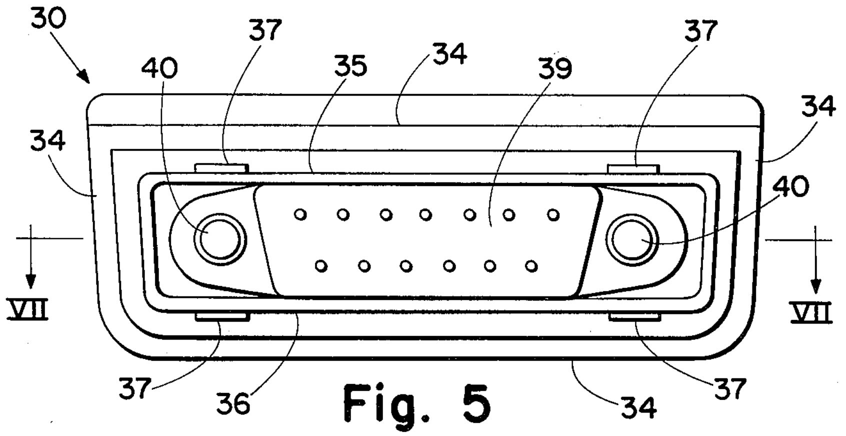
FIGS. 5 and 6 are side and end views respectively of a cooperative part for the other telephone unit of a pair to be connected.
Figure 6:
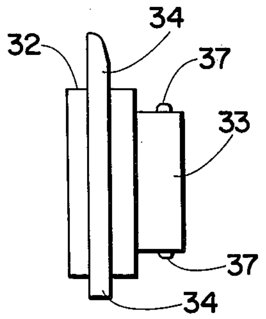
Figure 7:
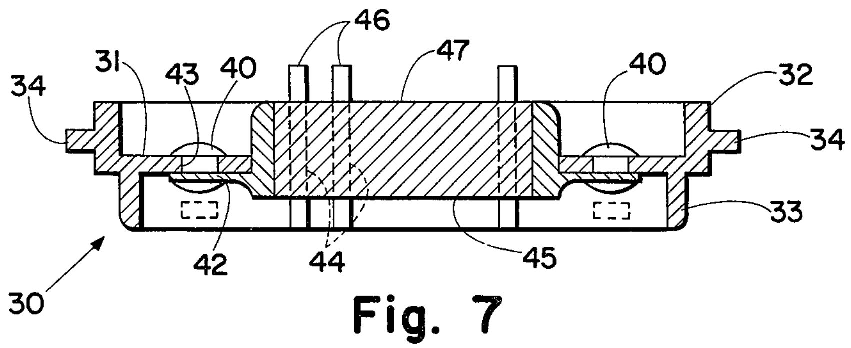
FIG. 7 is a cross-section on the line VII—VII of FIG. 5.

FIGS. 5, 6 and 7 illustrate the cooperating connector part 30, for the unit to be connected to that unit fitted with connector part 10 of FIGS. 1 to 4. Connector part 30 has male electrical terminals. The part 30 is of molded form, rectangular in shape, having a central web 31 with peripherally extending rims or flanges 32 and 33 extending in opposite directions. On one rim 32 there is a peripheral flange 34. Flange 34 serves to locate and position the part 30 in the housing of the unit, as will be described later.

Rim or flange 33 is of a size and shape to be a close sliding fit in the connector part 10 (FIGS. 1–4). On the top and bottom portions 35 and 36 of the exterior surface of the rim 33 small protrusions 37 are formed. The protrusions 37 are positioned so that when connector part 30 is pushed into connector part 10 the protrusions 37 fit into the recesses 24. There is some distortion of the connector part 10 as the protrusions 37 pass over the locally thickened parts 26, the protrusions then clipping into the recesses 24. The locally thickened parts 26 assist in retaining the protrusions into the recesses and resist pulling out of connector part 30.

The central web 31 has an aperture 38 therein, an electrical connector 39 being positioned in the aperture, retained by rivets 40 through holes 41 in a flange 42, on the connector 39, and also through holes 43 in the central web 31. The connector 39 has a plurality of terminals 44 therein, the terminals of male form at the front or forward face 45, and with electrical lead attachment tags 46 at the rear face 47.

As previously described, the connector parts 10 and 30 are positioned in the housing of the units to be connected by the flanges 11 and 34. This is obtained by providing apertures in the housing with channel or groove formations for receiving the flanges. FIGS. 8, 9 and 10 illustrate part of a housing 50, which can be the housing of any unit. Normally a housing will have top and bottom portions and conveniently an aperture 51 is formed in the bottom portion, extending down from the upper surface 52 which is a joint line with the upper part. The joint line is formed by a thin web or flange 53 extending round the periphery of the bottom portion, the web or flange overlapping a similar web or flange on the top portion of the housing.

The periphery of the aperture 51 is grooved at 54, providing a channel into which the flange 11 or flange 34 can be inserted by sliding in and downward. Once the two parts of the housing are joined together the connector part will be held firmly in place.

For convenience, and to improve the appearance of a unit when a connector part is not inserted in the aperture 51, a blank can be inserted. A suitable blank is illustrated in FIGS. 11 and 12. The blank 60 has a flange 61 around its periphery, which flange fits into the groove 54 in the housing of the unit. If desired, it can be arranged that the blank 60 is formed on its inner side 62, that is the side facing into the interior of the housing, to hold a connector part. Thus a unit can be supplied ready with a connector part ready wired and held in reserve on the inside of the blank. When needed, the unit housing is opened, the blank is slid out, the connector part removed from the blank and inserted into the aperture in the housing. Alternatively the connector part can be provided unwired, but a ready wired part will save considerable installation time.

FIG. 13 illustrates a connector in position connecting two units, the housing of each unit designated by the reference 50 to correspond with FIGS. 8, 9 and 10. The connector parts 10 and 30 are positioned in the housings 50, being in the channel or grooves 54. Connector part 30 has been inserted into connector part 10, with the protrusions 37 having been pushed past the portions 26 into the recesses 24. At the same time the male terminals 44 of connector part 30 have been inserted into the female terminals 18 of connector part 10.

FIG. 14 illustrates two units 65 and 66 prior to connection, with the connector parts 10 and 30 in position in the housings of the units, and FIG. 15 illustrates the two units 65 and 66 in connection side-by-side condition.

What is claimed is:

1. An interconnector for removably connecting two telephone sets in intimate side-by-side relationship, comprising:

a first connector part including a base, a rim extending peripherally of said base and normal to said base, a flange extending outwardly around said rim, an interior surface on said base, an aperture in said base, and a first electrical connector mounted in said aperture;

a first telephone housing having an aperture in a side surface thereof, said aperture opening to a peripheral edge of said housing, and a channel formation on the periphery of said aperture, said flange on said first connector sliding into said channel formation to retain said first connector in said first housing;

a second connector part including a central web, a first rim extending peripherally of said web and normal to said web, a second rim extending peripherally of said web and normal thereto in a direction opposite to that of said first rim, a flange extending peripherally of said first rim and outwardly therefrom, an exterior surface on said second rim, an aperture in said central web, and a second electrical connector mounted in said aperture, said second connector adapted to cooperate with said first connector for electrical connection therewith;

a second telephone housing having an aperture in a side surface thereof, said aperture opening to a peripheral edge of said housing, and a channel formation on the periphery of said aperture, said flange on said second connector sliding into said channel formation to retain the second connector in said second housing;

interengaging formations on each of said connector parts, said formations comprising recesses formed in one of said interior surface on said base of said first connector and said exterior surface of said second rim of said second connector and cooperative protrusions on the other of said interior and exterior surfaces, said formations inter-engaging to retain said first and second connector parts together and to retain said first and second telephone housings in side-by-side relationship.

2. An interconnector as claimed in claim 1, said base of said first connector part having a front face, said rim extending from said front face to form a hollow cup-shaped cross-section, said first electrical connector mounted in said aperture in said base attached to said front face and comprising a female connector part, said second electrical connector comprising a male connector part.

* * * * *